United States Patent [19]

Kiesow

[11] 3,854,878
[45] Dec. 17, 1974

[54] METHOD AND APPARATUS FOR DERIVING OXYGEN ASSOCIATION RATE CURVES FOR BLOOD SAMPLES

[75] Inventor: Lutz A. Kiesow, Bethesda, Md.

[73] Assignee: Baxter Laboratories, Inc., Morton Grove, Ill.

[22] Filed: Apr. 13, 1973

[21] Appl. No.: 351,014

[52] U.S. Cl. .............. 23/230 B, 23/253 R, 356/39, 356/41, 356/205, 356/246
[51] Int. Cl. ...................... G01n 21/24, G01n 33/16
[58] Field of Search ............. 23/230 B; 356/205, 39, 356/41

[56] References Cited
UNITED STATES PATENTS

| | | | |
|---|---|---|---|
| 2,685,815 | 8/1954 | Mayne | 356/41 |
| 3,029,682 | 4/1962 | Wood | 356/41 |
| 3,572,995 | 3/1971 | Martin | 23/230 B |
| 3,779,708 | 12/1973 | Runck | 23/230 B |
| 3,787,124 | 1/1974 | Lowy | 356/205 |

OTHER PUBLICATIONS
Chemical Abstracts, 73, 11325t, (1970).

Primary Examiner—Morris O. Wolk
Assistant Examiner—Sidney Marantz
Attorney, Agent, or Firm—Herman L. Gordon; Richard G. Kinney; Louis Altman

[57] ABSTRACT

A method and apparatus for deriving an oxygen association rate curve for a blood sample wherein the sample is introduced into a transparent-walled cell and is deoxygenated by contact with a deoxygenated fluorocarbon material. The cell is located in the optical path of two time-shared respective monochromatic beams, one having a wavelength at which there is substantially no change in absorbance as between oxygenated and deoxygenated blood and the other having a wavelength at which there is a relatively large change in absorbance as between oxygenated and deoxygenated blood. The difference in absorbance through the cell of the two wavelengths is measured and recorded while oxygenated fluorocarbon titrant material is pumped through the cell, the cell having a restricted flow passage for the titrant material which acts to separate the blood therefrom and retain it in the cell while the titration is taking place.

5 Claims, 4 Drawing Figures

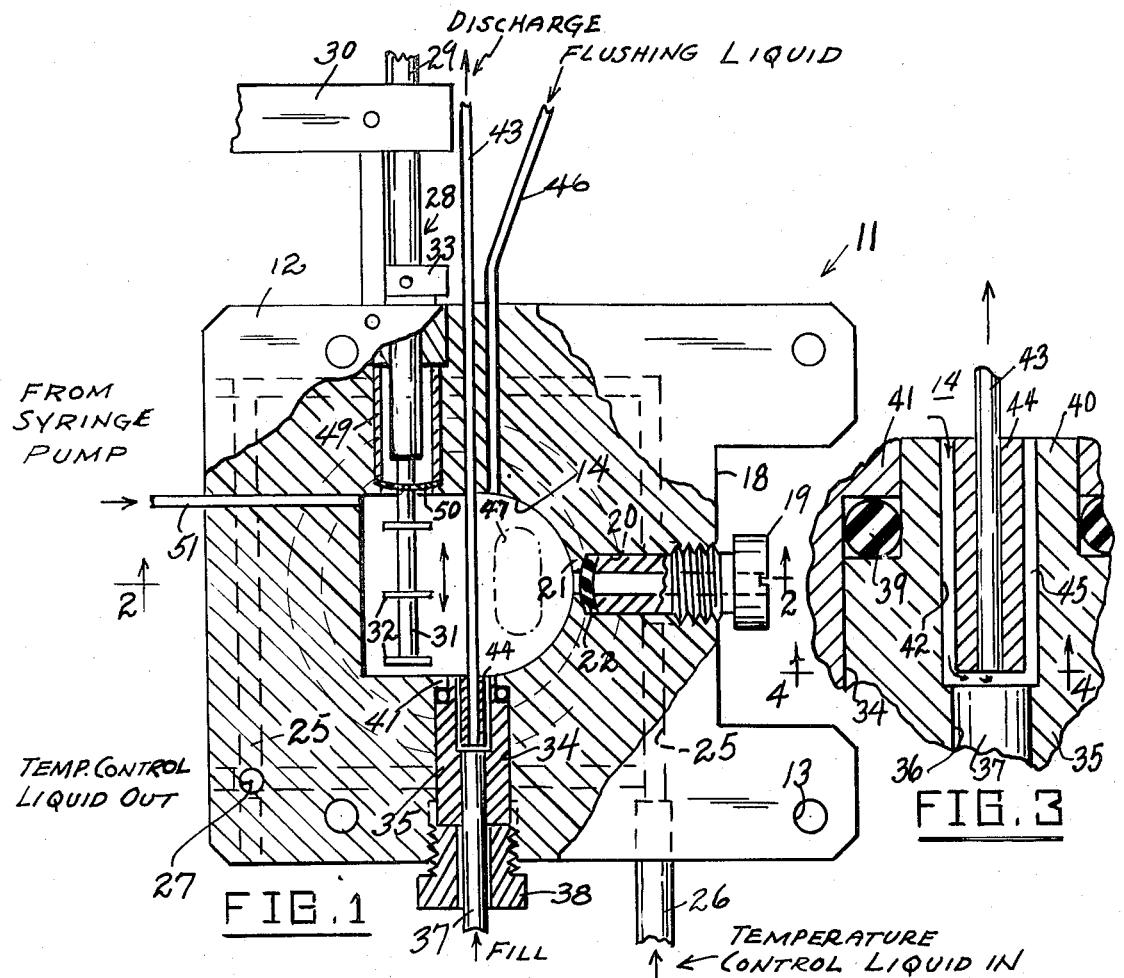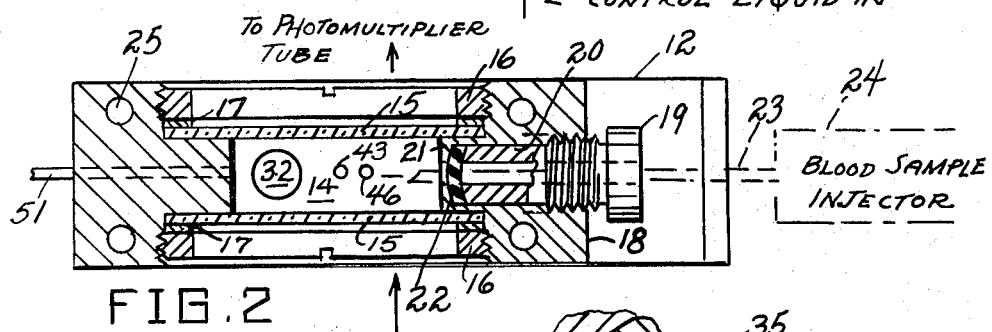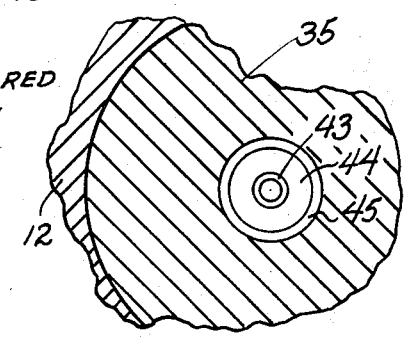

METHOD AND APPARATUS FOR DERIVING OXYGEN ASSOCIATION RATE CURVES FOR BLOOD SAMPLES

This invention relates to methods and apparatus for measuring the oxygenation characteristics of blood or other material whose light-absorbing characteristics change while being treated with a reagent, and more particularly to a method and apparatus for deriving an oxygen association rate curve for a blood sample.

A main object of the invention is to provide a novel and improved technique for differentially studying the light absorbing properties of materials being treated with reagents which modify said light absorbing properties, and particularly for measuring the rate of oxygenation of a blood sample while it is being treated with an oxygenating reagent.

A further object of the invention is to provide an improved method and apparatus for measuring and recording the change in light absorbance of a blood sample being treated with an oxygenating reagent, the method involving relatively simple procedural steps and requiring only a small amount of the sample, and the apparatus being relatively inexpensive to construct and being easy to operate.

A still further object of the invention is to provide an improved absorbance cuvette or cell for use with a dual wavelength photometer apparatus for measuring the oxygenation characteristics of blood or similar material being treated with a reagent which changes the light-absorbing characteristics of the material.

A still further object of the invention is to provide an improved absorbance cell for use with a dual wavelength photometer or similar optical instrument for deriving the oxygen association rate curve of a blood sample, the cell enabling a sample to be readily injected therein and to be subsequently titrated with a liquid oxygenating material while time-shared light beams of specific wavelengths are passed through the cell, enabling the differential absorbance of said wavelengths to be measured while the sample is being oxygenated, the cell enabling the titrant to be pumped through the cell while retaining the blood sample therein.

Further objects and advantages of the invention will become apparent from the following description and claims, and from the accompanying drawings, wherein:

FIG. 1 is an elevational view, partly in vertical cross-section, of an improved absorbance-measuring cell adapted to be employed with a dual wavelength photometer in accordance with the present invention.

FIG. 2 is a horizontal cross-sectional view taken substantially on the line 2—2 of FIG. 1.

FIG. 3 is an enlarged fragmentary vertical cross-sectional view taken through the phase separation, or blood retention, portion of the cell of FIGS. 1 and 2.

FIG. 4 is an enlarged fragmentary horizontal cross-sectional view taken substantially on the line 4—4 of FIG. 3.

Reference is made to the previously filed patent application of George W. Lowy, Paul Priarone and Herbert M. Cullis, Ser. No. 291,046, filed Sept. 21, 1972, now issued as U.S. Pat. No. 3,787,124, entitled "Dual Wavelength Photometer for Absorbance Difference Measurements." This previously filed application discloses a dual wavelength photometer wherein time-shared monochromatic wavelengths $\lambda_R$ and $\lambda_M$, respectively 448 nm and 439 nm, are sequentially passed through a cuvette containing a blood sample being titrated by an oxygenating material, the beams impinging on a photomultiplier tube, and appropriate circuitry being provided to segregate the responses produced by the two wavelengths and to record the absorbance difference of the blood sample during the course of the oxygenating titration. As is pointed out in said previously filed application, the reference wavelength $\lambda_R$, namely, 448 nm, is of a value such that there is substantially no change in absorbance as between oxygenated and deoxygenated blood, whereas the measure wavelength, namely, 439 nm is of a value at which there is a relatively large change in absorbance as between oxygenated and deoxygenated blood. The instrument thus plots the difference in absorbance for the two wavelengths with time as the sample is being oxygenated.

In the apparatus disclosed in said previously filed application, oxygen is generated at a constant rate in an optical cell containing a blood sample in the liquid phase, employing a dilute hydrogen peroxide solution of known concentration as titrant and catalase as a decomposition catalyst. Oxygen is thereby generated stoichiometrically at a rate which is proportional to the rate of the controlled titrant flow into the cuvette.

Improved results can be obtained by employing a liquid perfluorinated carbon compound as the titrant, for example, Mediflor FC-43, FC-47 or FC-80, manufactured by the 3M Company, Inc., Minneapolis, Minnesota, which are fluorocarbon materials which can be readily deoxygenated and oxygenated, and which can be efficiently used as deoxygenating and oxygenating reagents for blood samples. One of the objectives of the present invention therefore is to provide a cuvette wherein this type of titrant can be satisfactorily employed and which can be incorporated for use in a dual wavelength photometer of the type described in said previously filed application, or in other absorbance-measuring instruments.

Referring now to the drawings, 11 generally designates an improved titration cell for use in an oxygen association rate curve-deriving techinque according to the present invention. The typical titration cell 11 comprises a metal block 12 of generally rectangular shape provided with a plurality of mounting apertures 13. The block is formed with a central cavity 14 and is provided on opposite sides of the cavity with transparent parallel circular window discs 15, 15 clampingly secured in circular recesses provided therefor by retaining rings 16, 16 threadedly engaged in the circular recesses. Flat annular sealing gaskets 17, 17 are provided between the clamping rings 16 and the transparent window discs 15.

The block 12 is formed at one side thereof with a large rectangular notch 18, and a flanged injection guide conduit member 19 is threadedly engaged in a bore 20 extending from the midportion of the notch 18 toward the cavity 14. The inner end of the bore 20 adjacent cavity 14 is reduced to define an annular retaining seat 21 against which a rubber septum disc 22 is clamped by the inner end of conduit member 19. The septum disc 22 is penetrable by the hollow needle 23 of a hypodermic syringe 24 employed to inject a blood sample into cavity 14, as will be presently described.

The block 12 is formed with drilled passages 25 extending around cavity 14 and appropriately plugged at ends thereof to define a means for circulating temperature-controlling liquid so as to maintain the temperature of the block at a controlled value. The temperature-control liquid is admitted to the passages through an inlet conduit 26, and the liquid leaves the block through an outlet passage 27, whereby the liquid can circulate through the passages 25 and thereby maintain a constant temperature in the cavity 14.

As will be presently explained, it is desirable to agitate the contents of cavity 14, and therefore an agitating mechanism 28 is provided on the top portion of block 12, said mechanism being driven by a rotary shaft 29 journalled in a bearing bar 30 suitably secured to the main block 12. The shaft 29 reciprocates an agitator rod 31 extending into cavity 14, said rod having spaced agitating flanges 32. The mechanism 28 is provided with a conventional motion-converting assembly 33 between rod 31 and shaft 29 which converts the rotary movement of the shaft into reciprocating axial movement of rod 31.

The agitator rod 31 extends into cavity 14 through a housing sleeve 49 mounted in the upper portion of block 12 and provided at its bottom end with a flexible cover diaphragm 50, the rod being sealingly secured to and extending through the center portion of said diaphragm.

Block 12 is formed with a counterbored bottom filling passage 34 in which is seated a sleeve member 35 having a lower central bore portion 36 in which is secured the end of a filling tube 37. A screw bushing 38 surrounds tube 37 and is threadedly engaged with the block 12 below sleeve member 35 and clamps said sleeve member against a resilient deformable O-ring 39 engaged around the reduced top neck portion 40 of sleeve member 38, the O-ring 39 being thus forced against the annular seat 41 defined at the top end of counterbored passage 34.

Sleeve member 38 has an enlarged vertical upper bore portion 42 communicating with cavity 14. A vertical outlet tube 43 extends through the top portion of block 12 in alignment with bore portion 42 and is provided at its lower end with an elongated collar member 44, said tube lower end and collar member extending downwardly into bore portion 42 in the manner shown in FIG. 3 and defining a generally cylindrical constricted passage 45 between cavity 14 and the lower end of outlet tube 43. The spacing between the exterior surface of collar member 44 and bore portion 42 is of the order of 0.005 inch and the height of the collar member in said bore portion is substantial, being of the order of at least ½ inch, so that the constriction 45 has substantial axial length. As will be presently explained, the axial length of said constriction is sufficient to enable blood to separate from reagent liquid flowing from cavity 14 downwardly into bore portion 42 toward the bottom end of outlet tube 43 while the mixture in cavity 14 is being agitated by the action of rod 31.

A flushing tube 46 is secured in the top portion of block 12 in communication with the top of cavity 14 for a purpose presently to be described.

A titrant admission tube 51 extending to and communicating with the upper corner portion of cavity 14 opposite conduit member 19 is secured in block 12. Tube 51 is connected to a suitable syringe pump containing oxygenated fluorocarbon material, such as Mediflor FC-43, or the like, as above identified.

Input shaft 29 of agitator driving mechanism 28 is connected to a suitable driving means, such as an electric motor or the like, not shown.

The cell 11 is mounted in the optical path of the associated dual wavelength photometer so that the time-shared $\lambda_R$ and $\lambda_M$ light beams pass transversely through the windows 15 and substantially through an area shown in dotted view at 47.

In operating the apparatus, a quantity of fluorocarbon liquid material, such as Mediflor FC-43, or the like, is first deoxygenated by external conventional means, such as degassing with nitrogen or other inert gas, and is inserted into cavity 14 through filling tube 37, completely filling the cavity, overflow taking place through the exit tube 43.

With the cell 11 mounted in the photometer, a blood sample (typically partially oxygenated) is then injected into the cavity 14 through the conduit member 19 by means of a hypodermic syringe, as illustrated in dotted view in FIG. 2.

The agitator mechanism 28 is activated and remains in operation throughout the remaining procedure.

At this stage, deoxidation of the injected blood sample takes place by contact with the fluorocarbon liquid and because of dilution. Complete deoxidation of the blood sample is then performed by flushing the cavity 14 with deoxygenated fluorocarbon material admitted into the cavity through the flushing tube 46.

The optical system is then balanced by employing a procedure similar to that described in previously filed application Ser. No. 291,046, above identified, and the electronic system thereof is activated so that the instrument begins to record.

Externally oxygenated fluorocarbon material (Mediflor FC-43, or the like) is then pumped into the cavity 14 through tube 51, which begins the titration process. In this step, and in the previously described flushing (deoxidation of the blood sample) step, excess fluorocarbon material leaves the cell through the "phase separator" restriction 45 and tube 43, the blood being retained because the blood floats back up into cavity 14 while the relatively less bouyant fluorocarbon material passes through the restriction 45 and is flushed out through tube 43. The optical measurements are made during this stage of the procedure and an oxygen association rate curve is recorded in a manner similar to that described in the previously filed application Ser. No. 291,046.

While a specific embodiment of an improved method and apparatus for deriving an oxygen association rate curve for a blood sample has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A method of deriving an oxygen association rate curve for a blood sample comprising deoxygenating the sample, introducing an oxygenating agent into the sample, passing two respective monochromatic wavelengths through the sample while it is being oxygenated, one wavelength at which there is substantially no change in absorbance as between oxygenated and deoxygenated blood and the other wavelength at which there is a relatively large change in absorbance as between oxygenated and deoxygenated blood, and plotting the difference in absorbance for the two wavelengths with time as the sample is being oxygenated.

2. The method of claim 1, and wherein the blood sample and the oxygenating agent are agitated while oxygenation of the blood sample is taking place.

3. The method of claim 1, and wherein said one wavelength has a value of approximately 448 nm and said other wavelength has a value of approximately 439 nm.

4. The method of claim 1, and wherein the oxygenating agent comprises oxygenated fluorocarbon liquid material.

5. The method of claim 4, and wherein deoxygenation of the sample comprises exposing it to deoxygenated fluorocarbon liquid material.

* * * * *